United States Patent [19]

Weibel

[11] Patent Number: 6,124,929
[45] Date of Patent: Sep. 26, 2000

[54] MICHELSON INTERFEROMETER WITH ORBITING RETROREFLECTOR

[76] Inventor: Stephen C. Weibel, 822 Oneida Pl., Madison, Wis. 53711

[21] Appl. No.: 09/135,765

[22] Filed: Aug. 18, 1998

[51] Int. Cl.[7] ..................................................... G01B 9/02
[52] U.S. Cl. ........................................... 356/346; 356/358
[58] Field of Search .................................... 356/346, 345, 356/358

[56] References Cited

U.S. PATENT DOCUMENTS

| 4,383,762 | 5/1983 | Burkert .................................... 356/346 |
| 5,331,399 | 7/1994 | Tank et al. ............................... 356/346 |
| 5,491,551 | 2/1996 | Mattson ................................... 356/346 |

OTHER PUBLICATIONS

Article, C.J. Manning, Smoke and Mirrors: Ultra–Rapid–Scan FT–IR Spectrometry, Aug., 1997; pp. 1–12.
Aspen International Conference on Fourier Spectroscopy, 1970; Air Force Cambridge Research Laboratories; George A. Vanasse et al., pp. 48, 49 and 53.
Article, Edson R. Peck, "A New Principle in Interferometer Design, " Journal of the Optical Society of America, Jan. 1948, p. 66.

Primary Examiner—Robert H. Kim
Attorney, Agent, or Firm—Emrich & Dithmar

[57] ABSTRACT

A Michelson interferometer includes a beamsplitter onto which an input light beam is directed. The beamsplitter divides the input light beam into a first beam portion incident upon a first fixed reflector and a second beam portion incident upon a movable retroreflector. The movable retroreflector reflects the second beam onto another fixed reflector and then back to the beamsplitter where the first and second beams are combined and directed to a detector. The movable retroreflector is attached to one end of a rotating arm moving at a constant angular velocity. The retroreflector reflects the second beam at a fixed location in its orbital path. The angular velocity of the retroreflector and rotating arm combination may be varied over a wide range to provide a large modulated frequency bandwidth. The operating duty cycle of the interferometer may be doubled by attaching a second retroreflector to the other end of the rotating arm, with the weights of the two retroreflectors counterbalancing each other. The interferometer's optical alignment is insensitive to angular tilt and lateral shear (horizontal and vertical translation) of the interferometer's scanning element.

13 Claims, 2 Drawing Sheets

MICHELSON INTERFEROMETER WITH ORBITING RETROREFLECTOR

FIELD OF THE INVENTION

This invention relates generally to apparatus for use in Fourier spectroscopy and is specifically directed to a Michelson interferometer which is particularly insensitive to angular tilt and horizontal/vertical translation of the interferometer's scanning element.

BACKGROUND OF THE INVENTION

Fourier spectroscopy for analyzing the composition of a sample typically employs a two-beam interferometer such as a Michelson interferometer wherein a light beam is divided by partial reflection into two separate wavefronts, one directed along a fixed-length arm and the other directed along a variable-length arm which is varied to cause intensity modulation. In the usual rapid-scan mode of operation, a collimated light beam in the spectrometer is modulated by scanning one of the interferometer mirrors to produce a constant modulation rate. The resulting modulation signal, or interferogram, as modified by interaction with a sample under observation, is provided to a detector for detection and then Fourier transform (FT) processing.

In the typical Michelson interferometer, the scanning mirror is displaced in the direction of the light beam by a suitable mechanical drive mechanism causing the intensity of the central spot in the interference pattern to fluctuate as a function of the position of the movable mirror. The movable mirror typically undergoes translational displacement in a reciprocating manner. This high speed, reciprocating movement requires the use of a high precision linear bearing which substantially increases the cost of the interferometer. In addition, the requirement to displace the interferometer's scanning mirror at a constant velocity requires the use of a servo control loop which also contributes to the complexity and expense of the interferometer. The scanning mirror must be brought up to speed and be under the control of the servo loop during data collection. At the end of the scan, the mirror decelerates, stops, accelerates in the opposite direction, again comes under the control of the servo loop for the taking of data, again decelerates and stops. The next cycle begins with the acceleration of the scanning mirror in the opposite direction, with this sequence repeated. This type of reciprocating motion also requires considerable energy and gives rise to large momentum transfers to other instrument components frequently resulting in optical instabilities. Finally, this linear translation approach is generally limited to a maximum scanning mirror velocity of only 3 cm/sec and is characterized by a corresponding limited modulation range.

This type of interferometer is also highly sensitive to angular tilt and lateral shear (horizontal and vertical translation) of the scanning mirror which also reduces the modulation of the interferogram. One approach to reducing the effect of mirror tilt employs a retroreflector in the form of a cube corner reflector which directs the reflected beam along the same path as the incident beam. One attempt to avoid the problems encountered with translational, reciprocating displacement of the scanning mirror is disclosed in U.S. Pat. No. 4,383,762. This patent discloses a two-beam interferometer for Fourier spectroscopy including a rigid pendulum structure attached to a movable retroreflector. The swing of the rotatably journaled pendulum confines the retroreflector to movement in a single plane during scanning. This approach has a limited duty cycle and also requires a reciprocating, translational drive arrangement including magnets or springs, or a combination of both.

The present invention addresses the aforementioned limitations of the prior art by providing a Michelson interferometer with an orbiting retroreflector as the scanning element for essentially eliminating the sensitivity to the scanning element angular tilt and lateral shear, while providing a wide modulation bandwidth.

OBJECTS AND SUMMARY OF THE INVENTION

Accordingly, it is an object of the present invention to provide an improved Michelson interferometer for use in Fourier spectroscopy.

It is another object of the present invention to provide a Michelson interferometer having a scanning element which is displaced in an orbiting path and intercepts and reflects back the scanning beam at a fixed location in its orbit.

Yet another object of the present invention is to provide a scanning interferometer capable of operating in a continuously variable manner over a wide modulation frequency range.

This invention contemplates a Michelson interferometer for Fourier spectroscopy including a beamsplitter disposed in the path of an incident light beam for dividing the incident light beam into a first reflected beam portion and a second transmitted beam portion and for then combining the first reflected and second transmitted beam portions in forming an output light beam, wherein one of the first reflected or second transmitted beam portions is reflected back to the beamsplitter by a first stationary reflector for combining with the other of the first reflected or second transmitted beam portion in forming the output light beam, the interferometer characterized by an orbital displacement mechanism for rotating about a 360° circular arc at a constant angular velocity; and a retroreflector mounted to the orbital displacement mechanism and displaced about the 360° circular arc, wherein the retroreflector is aligned with the beamsplitter over a portion of the 360° circular arc for reflecting either the first reflected or second transmitted beam portion back to the beamsplitter for combining with the other of the first reflected or second transmitted beam portion.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
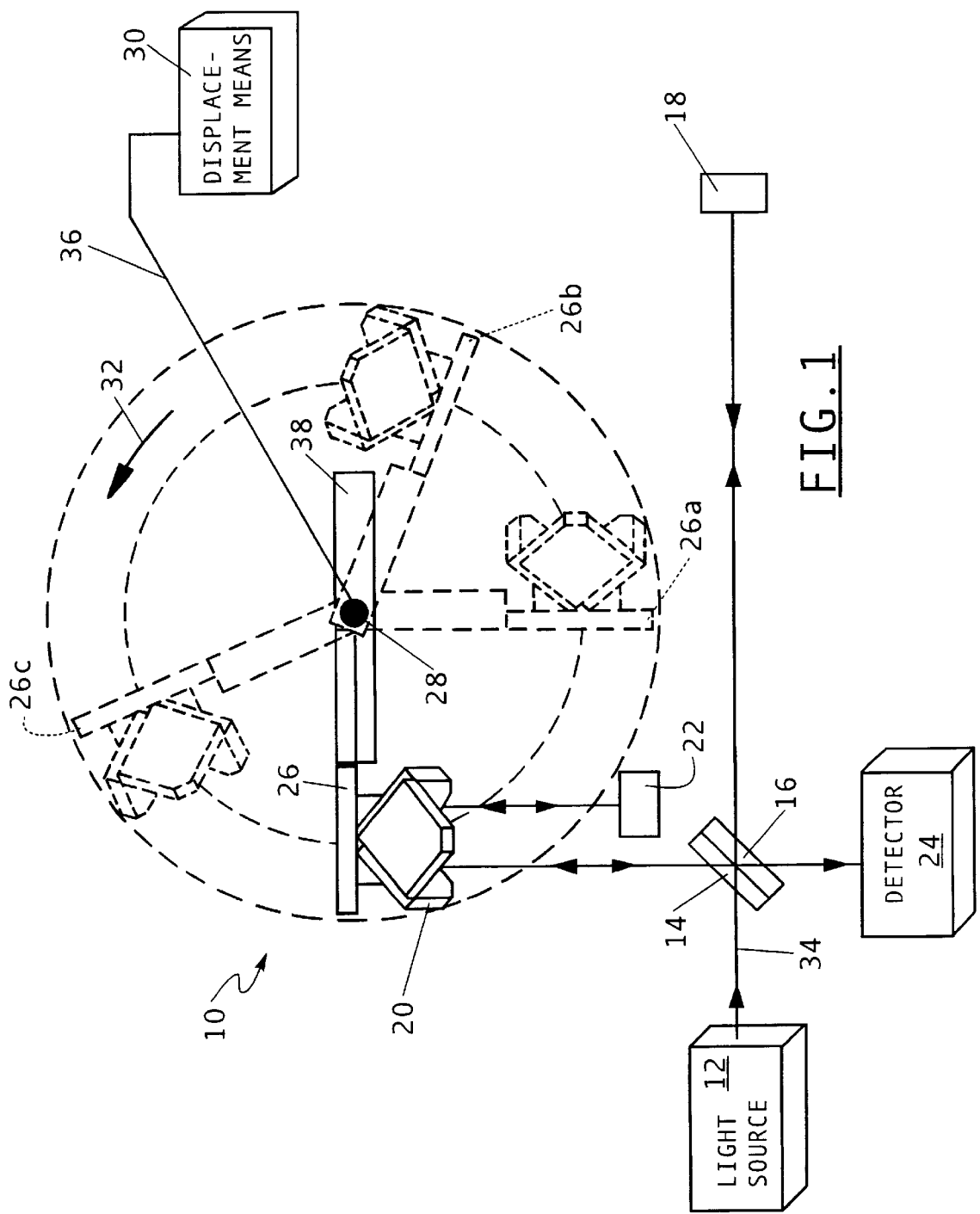
FIG. 1 is a simplified schematic diagram of a Michelson interferometer with an orbiting retroreflector scanning element in accordance with one embodiment of the present invention.

Referring to FIG. 1, there is shown a simplified schematic diagram of a dual-beam interferometer 10 incorporating an orbiting retroreflector in accordance with one embodiment of the present invention. The Michelson interferometer 10 includes a light source 12 for directing a light beam 34 onto and through a combination of a beamsplitter 14 and a compensation plate 16. A first portion of the incident light beam 34 is directed onto a first stationary mirror 18. The first stationary mirror 18 reflects the light beam back to the combination of the beamsplitter 14 and compensation plate 16 where a portion of the reflected light beam is then directed to a light detector 24.

A second portion of the incident light beam directed onto the combination of the beamsplitter 14 and compensation plate 16 is reflected onto a retroreflector 20. Retroreflector 20 is securely mounted to a rotating arm 26, one end of which is attached to and supported by a support shaft 28 defining the axis of rotation of the retroreflector 20 and rotating arm 26 combination. Attached to rotating arm 26 and disposed on the opposed side of support shaft 28 is a counterweight 38. Counterweight 38 reduces the amount of energy required to rotationally displace the retroreflector and also relaxes the structural requirements for the rotational coupling for the support shaft. Rotary displacement means 30 which may be conventional in design and operation, i.e., an electric motor, is coupled to and rotationally drives the support shaft 28 to which the rotating arm 26 is attached. The connecting linkage between the rotary displacement means 30 and the support shaft 28 may also be conventional in design and operation and is thus shown in the figure simply in the form of a connecting line 36. Rotary displacement means 30 rotationally drives the combination of support shaft 28, rotating arm 26 and retroreflector 20 in a counterclockwise direction as viewed in FIG. 1, or in the direction of arrow 32. Rotating arm 26 is thus shown in phantom as elements 26a, 26b and 26c in additional positions as it rotates about the axis of support shaft 28. When the combination of retroreflector 20 and rotating arm 26 are in the position shown in solid line form in the figure, the retroreflector reflects the light beam reflected from the beamsplitter 14 onto a second stationary mirror 22. The light beam is then reflected from the second stationary mirror back onto the retroreflector 20. Retroreflector 20 directs the reflected light beam onto the combination of beamsplitter 14 and compensation plate 16, with a portion of this reflected beam directed to the light detector 24. The two aforementioned portions of the incident light beam 34 are then combined in detector 24 and undergo Fourier transform analysis to provide an interferogram.

The rotating combination of retroreflector 20 and rotating arm 26 requires less power to drive than prior reciprocating translational drive mechanisms for the scanning mirror. In addition, because the retroreflector 20 orbits in a continuous manner at a fixed velocity, there is no substantial transfer of momentum from the retroreflector/rotating arm combination to other components of the interferometer. This elimination of momentum transfer in the interferometer reduces the likelihood of vibration arising in the various interferometer components resulting in optical instabilities and results in reduced wear on the moving components of the interferometer. In addition, a powerful drive motor in combination with an expensive linear bearing is not required in the orbiting retroreflector arrangement of FIG. 1 as in prior reciprocating, translating scanning interferometers. The present invention employs a single conventional rotary displacement means 30 such as an electric motor for rotating the retroreflector 20 and rotating arm 26 in a single direction as well as in a continuous manner at a constant angular velocity. Rotational speeds of retroreflector 20 of as high as 100 cm/sec are possible in the present invention using conventional rotary displacement means which allows for increased modulation bandwidth of the interferometer signal. This increased modulation signal bandwidth allows the dual beam interferometer 10 of the present invention to be used with faster detectors than those available in current interferometers for increased measurement sensitivity. In addition, the higher modulation frequencies available in the inventive Michelson interferometer 10 allow this interferometer to be used in time-resolution experiments. The modulation frequency may be further increased by using lightweight materials such as Beryllium for retroreflector 20 and rotating arm 26.

Figure 2:
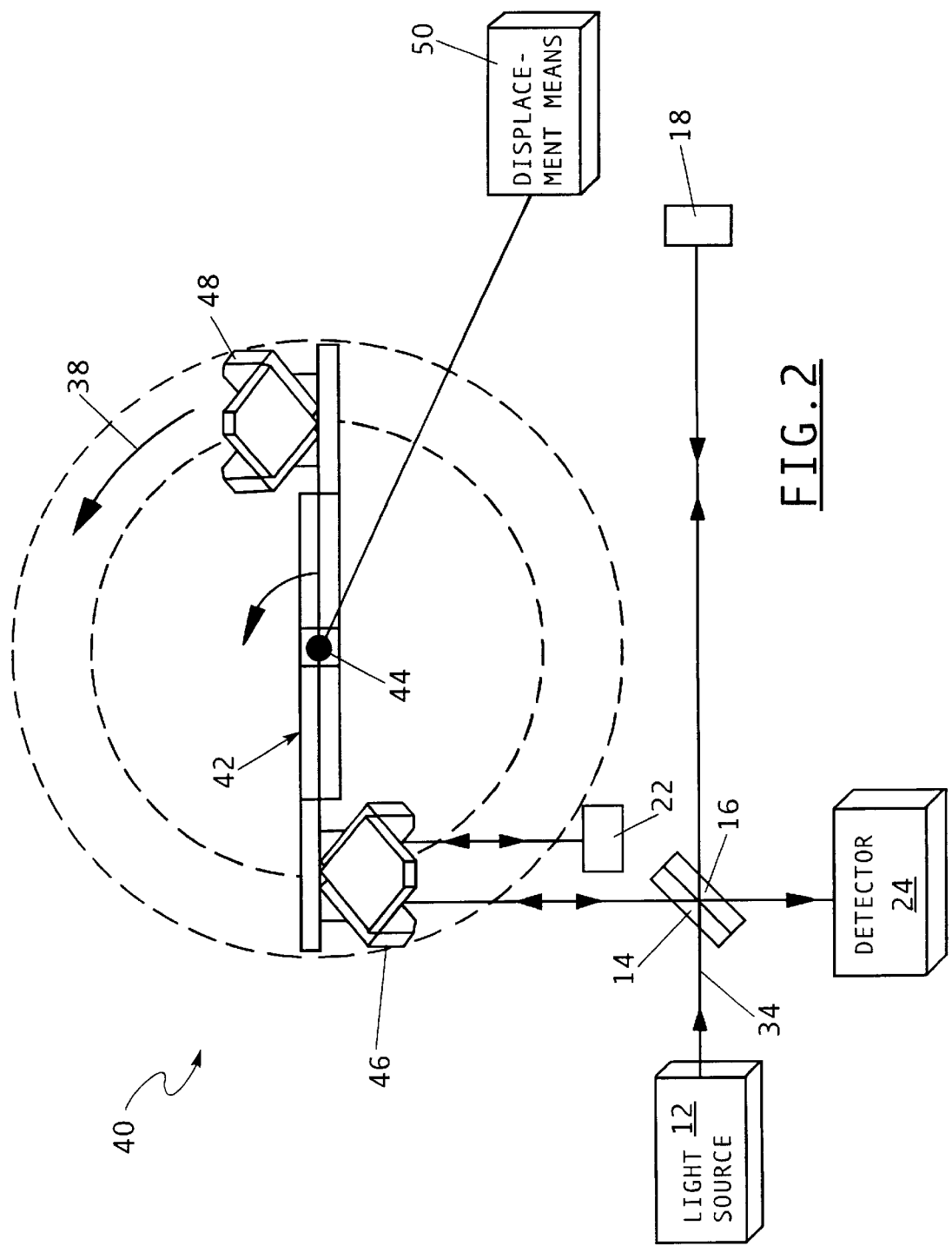
FIG. 2 is a simplified schematic diagram of another embodiment of a dual-beam interferometer in accordance with the present invention incorporating a pair of orbiting retroreflectors.

Referring to FIG. 2, there is shown in simplified schematic diagram form a dual-beam interferometer 40 in accordance with another embodiment of the present invention. In FIGS. 1 and 2, like reference characters are used to identify like elements in the two Michelson interferometers. Thus, Michelson interferometer 40 also includes a light source 12, a beamsplitter 14 and compensation plate 16 combination, first and second stationary mirrors 18,22, and a light detector 24. The difference between the Michelson interferometer 40 shown in FIG. 2 and the dual-beam interferometer 10 shown in FIG. 1 is that the former includes first and second retroreflectors 46 and 48 mounted to a rotating arm 42. Attached to and providing support for the rotating arm 42 is a support shaft 44. Support shaft 44 is rotationally displaced by means of rotary displacement means 50 coupled thereto. With the first and second retroreflectors 46,48 attached to respective ends of the rotating arm 42, the two retroreflectors counterbalance each other as the rotating arm 42 is rotationally displaced about the axis of the support shaft 44 in the direction of arrow 38. This reduces the amount of energy required to rotationally displace the two retroreflectors and also relaxes the structural requirements for the rotational coupling for support shaft 44. In addition, providing first and second retroreflectors 46,48 for each revolution of the rotating arm 42 doubles the duty cycle over that of the previously described embodiment of the invention shown in FIG. 1. The increased duty cycle capability of the Michelson interferometer 40 affords substantially greater data collection capability than available in prior art reciprocating, translating Michelson interferometers.

There has thus been shown a Michelson interferometer employing one or more orbiting retroreflectors as the scanning element. Data collection occurs over a small angular sector as the retroreflector, or retroreflectors, is continuously rotated in a single orbital direction. Orbital displacement of the retroreflector permits high scanning speeds and allows for a corresponding increase in interferometer signal bandwidth. This permits the interferometer to be used with high speed detectors. Increasing the number of orbiting retroreflectors allows for an increase in the duty cycle of the interferometer. The orbiting retroreflector arrangement operates essentially vibration free and requires little input power to initiate and sustain retroreflector orbital motion. The orbiting retroreflector arrangement of the present invention is also less sensitive to gravitational effects than reciprocating translational interferometer approaches and thus is more suitable for space-born applications which require the interferometer to operate at any angular orientation while undergoing translational motion of the interferometer and enclosure. The optical alignment of the inventive interferometer is insensitive to angular tilt and lateral shear (horizontal and vertical translation) of the interferometer's scanning element.

While particular embodiments of the present invention have been shown and described, it will be obvious to those skilled in the art that changes and modifications may be made without departing from the invention in its broader aspects. For example, while the invention is described in terms of the orbiting retroreflector reflecting the portion of the input light beam reflected by the beamsplitter, this invention will operate equally as well with the orbiting retroreflector reflecting the portion of the input light beam which is transmitted by the beamsplitter. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A Michelson interferometer for Fourier spectroscopy including a beamsplitter disposed in the path of an incident light beam for dividing the incident light beam into a first reflected beam portion and a second transmitted beam portion and for then combining said first reflected and second transmitted beam portions in forming an output light beam, wherein one of said first reflected or second transmitted beam portions is reflected back to said beamsplitter by a first stationary reflector for combining with the other of said first reflected or second transmitted beam portion in forming the output light beam, said interferometer characterized by:

orbital displacement means having an axis of rotation for rotating about a 360° circular arc at a constant angular velocity; and retroreflector means mounted to said orbital displacement means in a physically separated manner from said axis of rotation and displaced about said 360° circular arc, wherein said retroreflector means is aligned with said beamsplitter over a portion of said 360° circular arc for reflecting either said first reflected or second transmitted beam portion back to said beamsplitter for combining with the other of said first reflected or second transmitted beam portion.

2. The interferometer of claim 1 wherein said orbital displacement means includes a support arm coupled to said retroreflector means and rotary displacement means coupled to said support arm for rotationally displacing said retroreflector means and said support arm in an orbiting manner.

3. The interferometer of claim 2 further comprising a support shaft coupling said support arm to said rotary displacement means.

4. The interferometer of claim 3 wherein said support arm includes first and second opposed ends, and wherein said retroreflector means and said support shaft are respectively coupled to the first and second ends of said support arm.

5. The interferometer of claim 4 wherein said retroreflector means comprises a cube corner reflector.

6. The interferometer of claim 4 wherein said rotary displacement means includes an electric motor.

7. The interferometer of claim 2 wherein said rotary displacement means is capable of operating over a range of angular velocities for modulating a frequency of the output light beam.

8. The interferometer of claim 5 wherein said support shaft and said cubed corner reflector are comprised of a lightweight material.

9. The interferometer of claim 8 wherein said lightweight material is Beryllium.

10. The interferometer of claim 2 wherein said support arm includes first and second opposed ends, and wherein said retroreflector means includes first and second retroreflectors respectively mounted to the first and second ends of said support arm.

11. The interferometer of claim 10 wherein said support arm includes a center portion located midway between the first and second opposed ends thereof, and wherein said rotary displacement means is coupled to the center portion of said support arm.

12. The interferometer of claim 11 further comprising a support shaft extending through the center portion of said support arm for coupling said support arm to said rotary displacement means.

13. The interferometer of claim 4 further comprising a counterweight coupled to the second end of said support arm.

* * * * *